Aug. 28, 1934.   L. E. POOLE   1,971,426
COMMUTATOR TESTING APPARATUS
Filed May 29, 1930   8 Sheets-Sheet 1

Inventor
Lora E. Poole
By Spencer Hardman & Fehr
his Attorneys

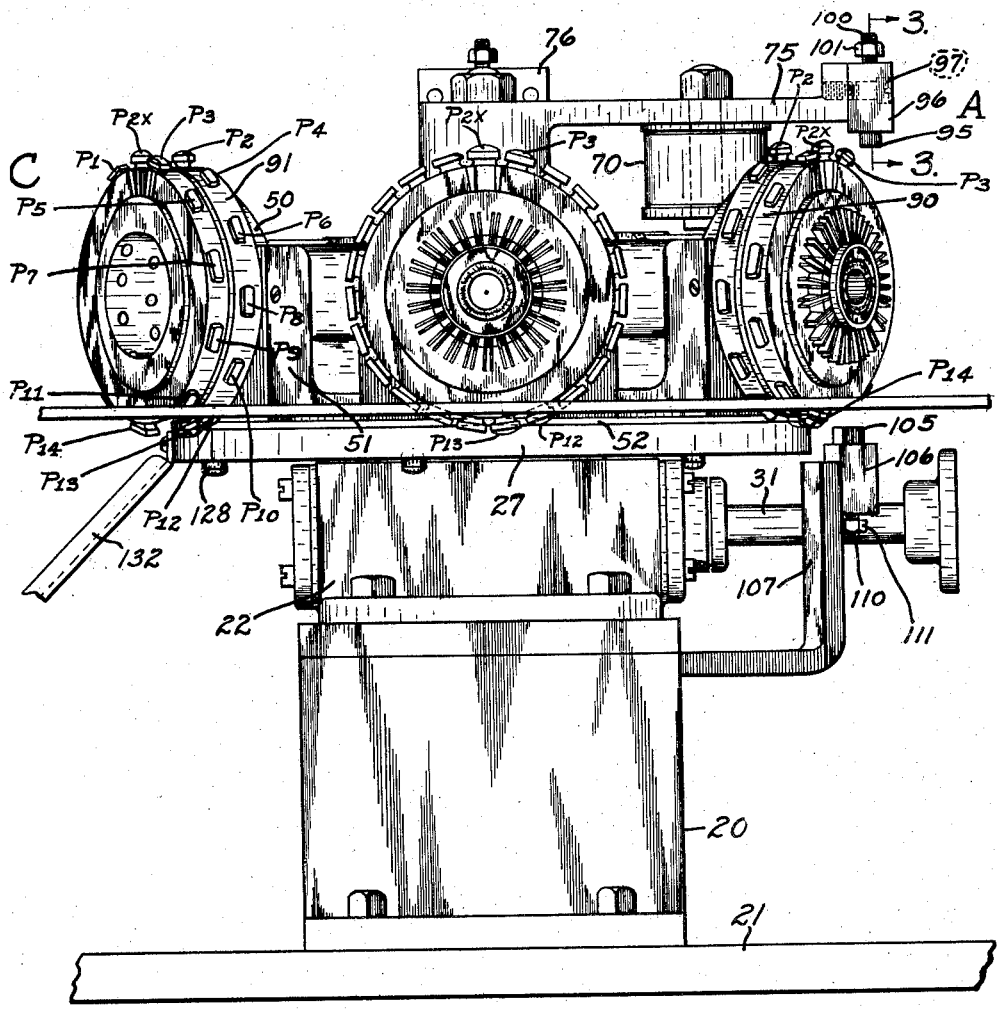
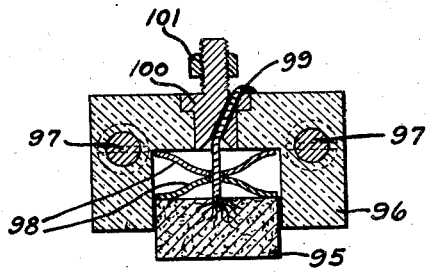
Fig. 2.
Fig. 3.

Aug. 28, 1934.  L. E. POOLE  1,971,426
COMMUTATOR TESTING APPARATUS
Filed May 29, 1930  8 Sheets-Sheet 7

Inventor
Lora E. Poole
By Spencer Hardman & Fehr
his Attorneys

Aug. 28, 1934.    L. E. POOLE    1,971,426
COMMUTATOR TESTING APPARATUS
Filed May 29, 1930    8 Sheets-Sheet 8

Inventor
Lora E. Poole
By Spencer Hardman & Fehr
his Attorneys

Patented Aug. 28, 1934

1,971,426

UNITED STATES PATENT OFFICE 1,971,426

COMMUTATOR TESTING APPARATUS

Lora E. Poole, Anderson, Ind., assignor, by mesne assignments, to General Motors Corporation, Detroit, Mich., a corporation of Delaware Application May 29, 1930, Serial No. 457,014

33 Claims. (Cl. 209—81)

This invention relates to the manufacture of commutators for dynamo electric machines and one of its objects is to provide apparatus for automatically inspecting commutators for short circuits between the segments and short circuits between the segments and the center core by which the commutator is mounted upon an armature shaft. More particularly, it is an object to provide apparatus which will automatically separate good commutators from those which have short circuits, and also separate commutators which have short circuits between their segments from commutators which have short circuits between their segments and the center core. In the disclosed embodiment of the present invention the apparatus provides a plurality of commutator holders located upon a conveyor which is preferably a turn-table. When the turn table arrives at a certain station the commutator is inspected for short circuits between the segments and is automatically ejected from the work holder if short circuits between the segments are found to exist. The commutator if ejected passes down a chute to a suitable container. If the commutator passes inspection it is retained in this work holder and is carried to a second station where it is automatically inspected for short circuits between its segments and the center core. If short circuits are found to exist, it is automatically ejected and passes down a chute to a suitable container. If the commutator passes this second inspection it is retained in the work holder and then passes to a final station where it is ejected and permitted to pass down a third chute into a suitable container.

Further objects and advantages of the present invention will be apparent from the following description, reference being had to the accompanying drawings wherein a preferred embodiment of one form of the present invention is clearly shown.

In the drawings:

Fig. 2 is a side elevation viewed in the direction of arrow 2 of Fig. 1.

Fig. 3 is a sectional view on line 3—3 of Fig. 2 and is drawn to a larger scale.

Figure 1:
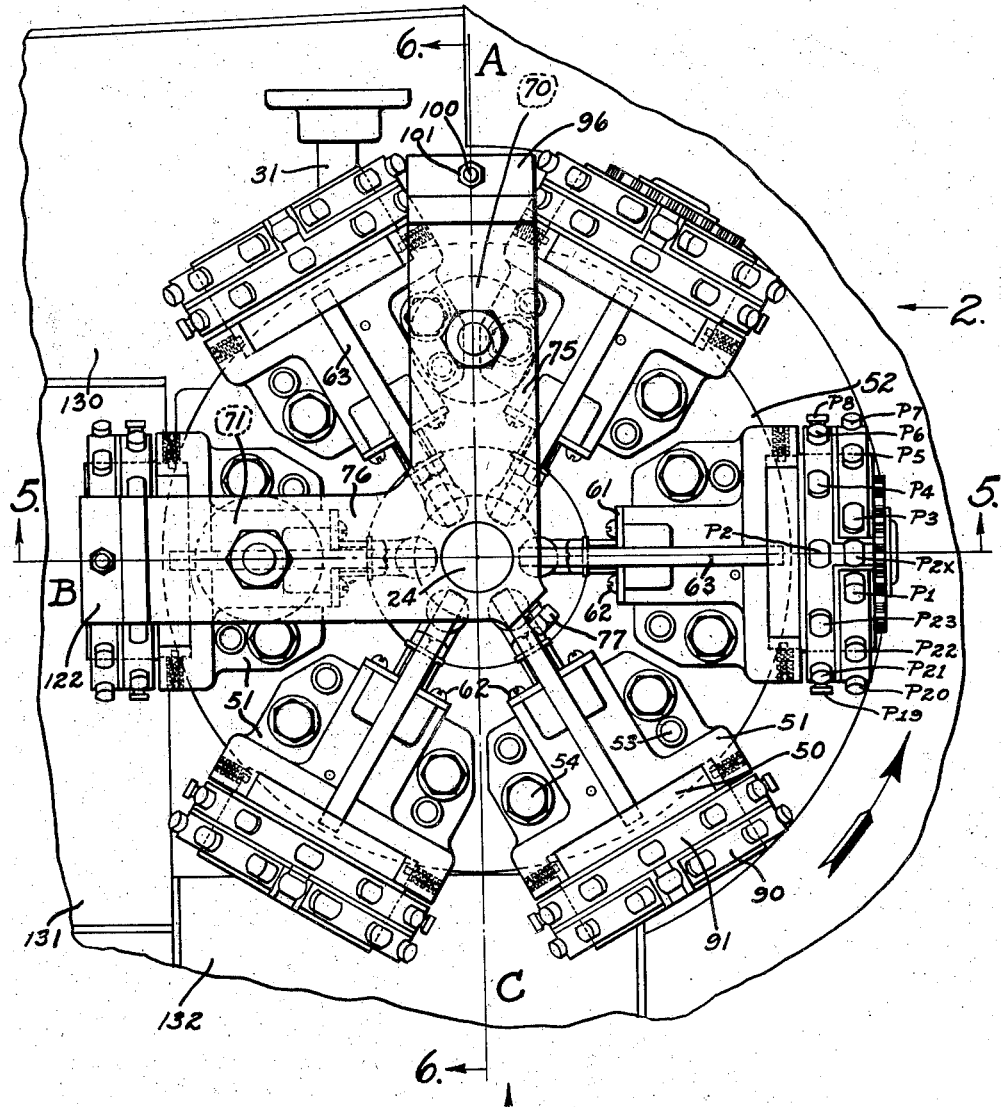
Fig. 1 is a plan view of apparatus embodying the present invention.
Figure 4:
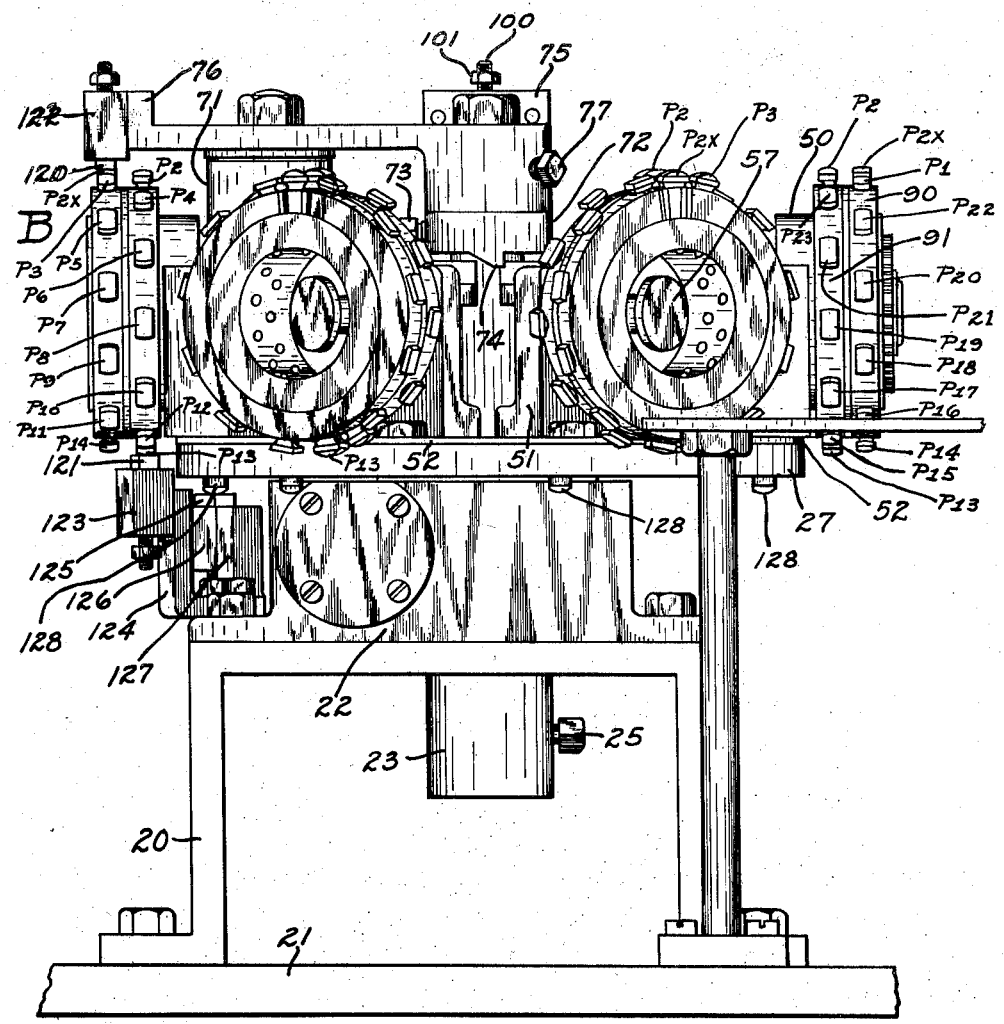
Fig. 4 is a side elevation viewed in the direction of the arrow 4 of Fig. 1.

The apparatus comprises a base 20 attached to a support such as a table 21 and supporting a gear housing 22 providing a tubular boss 23 which receives a stationary shaft 24 fixed by a screw 25 and providing a journal for a hub 26 of a turn table 27. The hub and the table are supported upon a thrust bearing 28 resting upon the bottom of the housing 22. The hub 26 carries a worm gear 29 driven by a worm 30 provided by a shaft 31 journalled in bearings 32 carried by the housing 22. The shaft 30 is driven in any suitable manner by an electric motor (not shown).

The table 27 insulatingly supports a plurality of work holders each adapted to receive a commutator comprising groups of segments and riser bars 40 insulated from each other by nonconducting segments 41 and clamped together by V-clamping rings 42 which are insulated from the segments by V-insulating rings 43 and which are held in clamping position by a central tubular core 44 having its ends riveted over at 45 against the outer surfaces of the V-clamping rings 42. Each commutator is received by a nonconducting support 50 attached to a metal bracket 51 which is supported by the table 27 but is separated therefrom by an insulating plate 52. The bracket 51 is located by a dowel 53 insulated from the bracket and is secured by screws 54 insulated from the bracket.

Figure 5:
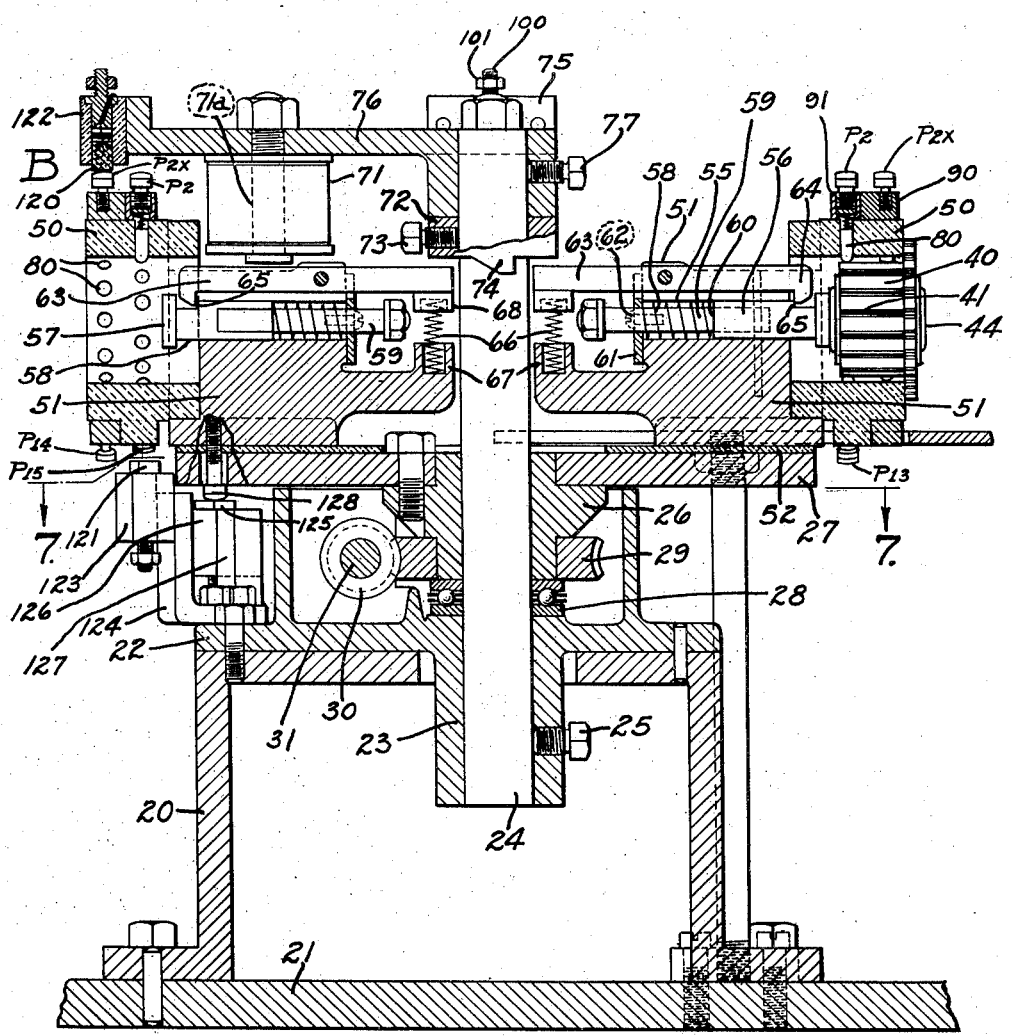
Fig. 5 is a transverse sectional view on the line 5—5 of Fig. 1.

Each bracket 51 provides a tubular guide 55 for a commutator ejecting plunger 56 having a head 57 adapted to engage the commutator core 44. The plunger 56 is urged outwardly against the commutator by a spring 58 surrounding a reduced portion or shank 59 of the plunger 56 and located between a shoulder 60 and a plate 61 secured by screws 62 to the bracket 51. The plunger 56 is normally held in position shown in Fig. 5 by a latch lever 63 having a hook 64 adapted to engage a shoulder 65 provided by the plunger. The lever 63 is normally urged into latching position by a spring 66 located between a recess boss 67 of the bracket 51 and a recess boss 68 attached to the lever 63. The lever 63 may be moved out of latching position by either of two electro-magnets 70 or 71 which are located in a radial alignment with stations A and B respectively in case either of these magnets are energized when a latch lever 63 passes under its pole piece. The latch lever 63 will be moved out of latching position in any event when the latch lever moves into radial alignment with station C. Referring to Fig. 5 it will be seen that a collar 72 secured by a screw 73 to the shaft 24 includes a cam 74 located in radial alignment with station C or in alignment with the cross section line 6—6 of Fig. 1. Magnets 70 and 71 include windings mounted on cores 70a and 71a respectively attached to arms 75 and 76 of a frame secured to the shaft 24 by a screw 77.

Each commutator holder 50 carries a plurality of equi-distant radially disposed plungers 80 which are arranged preferably in staggered relation in two annular rows. Each plunger slides through a recess 81 in the nonconducting holder 50 and is urged by a spring 82 inwardly and is connected by a flexible conductor 83 with a button 84 which is located in a recess which receives a metallic screw plug or terminal post 85. For convenience in describing the manner of completing circuits for testing the commutator these posts are numbered P1, P2, etc. to P23 inclusive respectively to designate that they are connected each with a plunger 80 which bears against one of the commutator segments. As the problem of completing these circuits is more difficult when the commutator has an odd number of segments than when the number is even, the disclosed embodiment of the invention is one which has been arranged for a commutator having twenty-three segments. The posts P1, P3, P5, P7, P9, P11, P14, P16, P18, P20, P22 are screwed into threaded recesses provided in a metallic annular segment 90 fastened to the holder 50. Posts P2, P4, P6, P8, P10, P12, P15, P17, P19, P21 and P23 are screwed into threaded recesses provided in the metallic annular segment 91 also attached to the holder 50 and insulated from the segment 90. The post P13 is not connected with either of the segments and may be threaded directly into the body 50 without requiring any metallic threaded member. It will be seen that the segment 90 ends with posts P1 and P3 and these ends are spaced apart so as to receive between them a conducting bar 92 which is attached to the segment 91 and which is provided with a post P2x located in the plane of the posts attached to segment 90.

Figure 8:
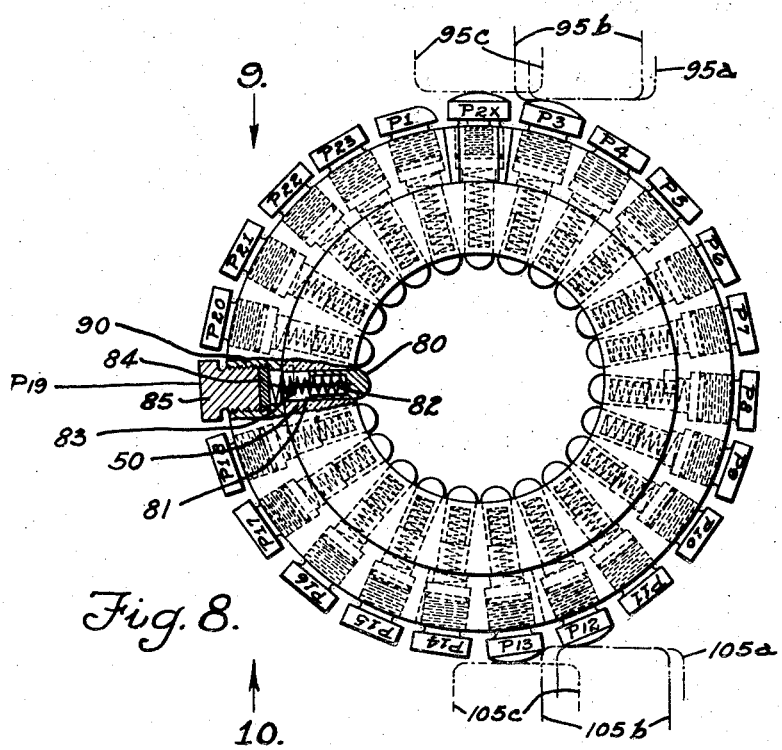
Fig. 8 is a full scale end elevation of a commutator work holder.
Figure 10:
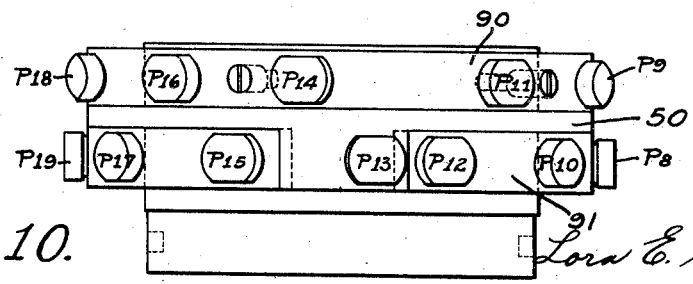
Fig. 10 is a bottom view thereof viewed in the direction of the arrow 10 of Fig. 8.

The posts P3 and P2x are provided with rounded heads as shown in Fig. 8 and are adapted to be engaged successively by a brush 95 guided for vertical sliding movement by a nonconducting brush holder 96 attached by screws 97 to the bracket arm 75, and urged downwardly by a pair of leaf springs 98 and connected by a pigtail 99 with a terminal post 100 embedded in the holder 96 and receiving a nut 101. The posts P12 and P13 are likewise provided with rounded heads and are successively engaged by a brush 105 which like brush 95 is supported by a brush holder 106 attached to a bracket 107 and connected with a terminal post 110 which receives a nut 111.

Figure 6:
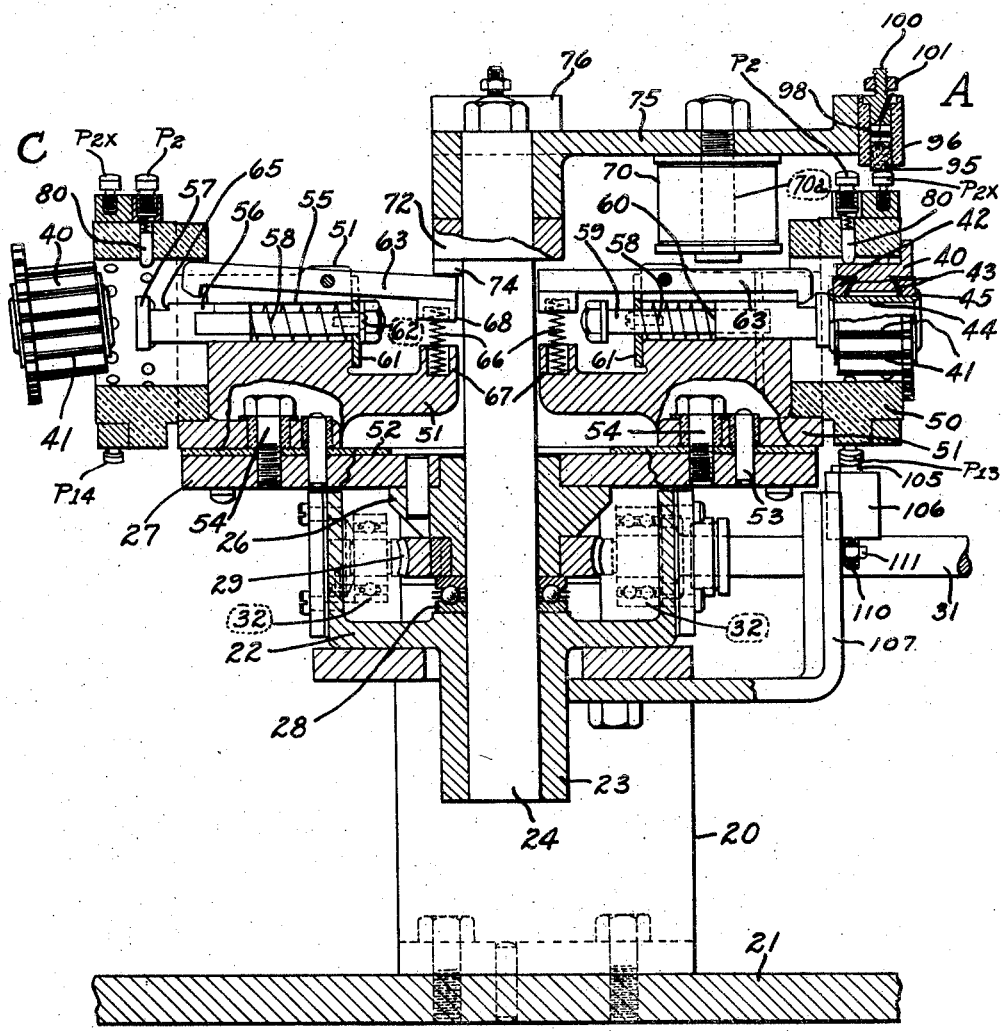
Fig. 6 is a transverse sectional view on the line 6—6 of Fig. 1.
Figure 7:
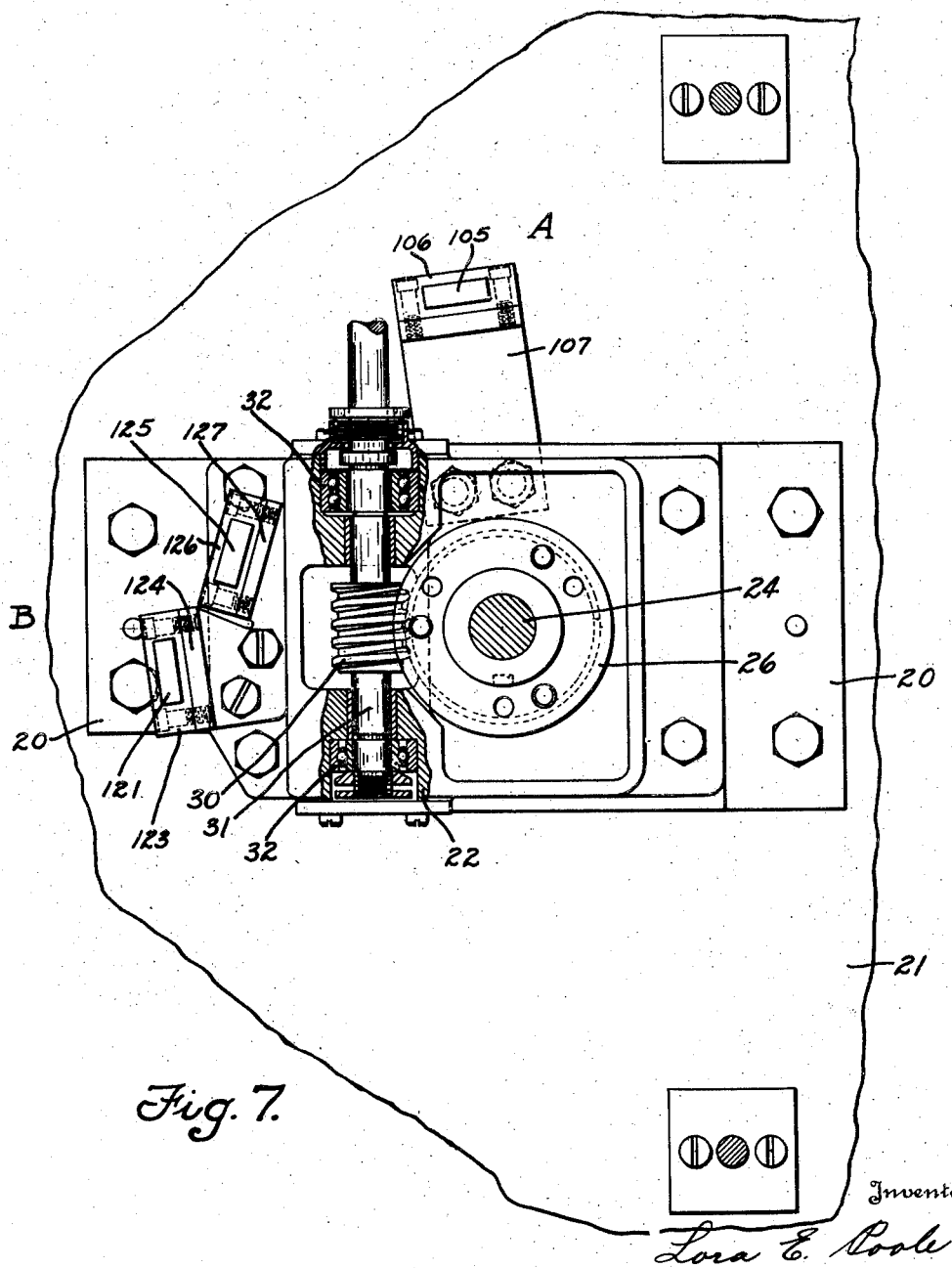
Fig. 7 is a sectional view on the line 7—7 of Fig. 5.
Figure 9:
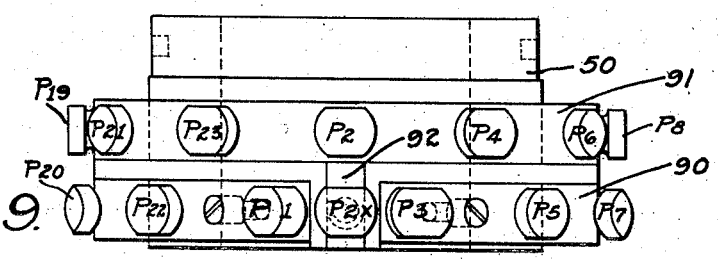
Fig. 9 is a top view thereof viewed in the direction of the arrow 9 of Fig. 8.
Figure 11:
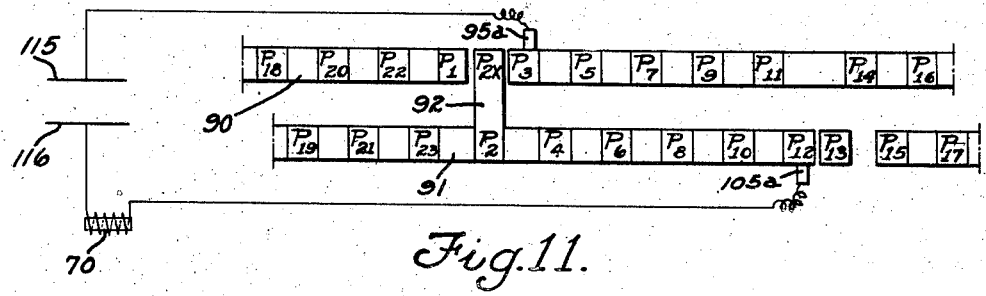
Figs. 11, 12 and 13 are wiring diagrams illustrating the manner of inspecting the commutator for short circuits between the segments.
Figure 12:
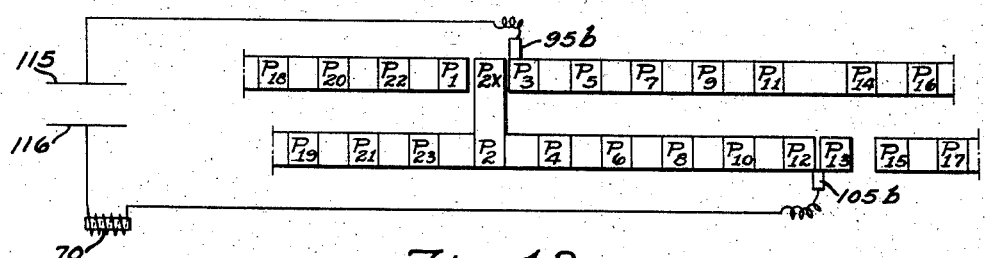
Figure 13:
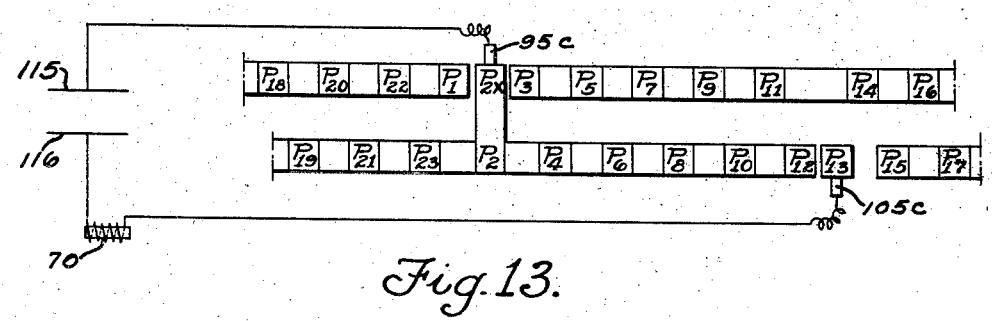
Figure 14:
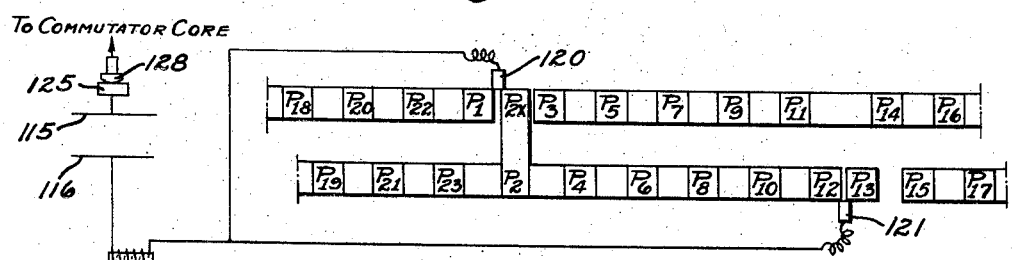
Fig. 14 is a wiring diagram illustrating the manner of inspecting the commutator for short circuits between any of its segments and its core.

The brush 95 cooperates with the post P3 and P2x and the brush 105 cooperates with the posts P12 and P13 in the following manner: In order to set up circuits which if completed by the presence of a short circuit between commutator segments would energize the magnet 70 so as to cause the commutator adjacent thereto to be ejected. As the brushes 95 and 105 have three important positions relative to the terminal posts of the commutator holder, the three positions of brush 95 are marked 95a, 95b, and 95c respectively as shown in Figs. 8, 11, 12, and 13, and likewise the three positions of the brush 105 are marked 105a, 105b, and 105c in these figures. Actually the commutator holder moves relative to the brushes in a counterclockwise direction as viewed in Fig. 1. This movement is represented in Fig. 8 by relative positions of these brushes reading from right toward left as though the brushes were moving toward the left whereas in reality the commutator holder moves toward the right as viewed in Fig. 8. Since Figs. 11, 12 and 13 are diagrams showing all of the terminal posts spread out in one plane it is necessary to indicate relative movement of brush 105 toward the right instead of toward the left as the case with brush 95. As the commutator holder swings in a counterclockwise direction between the brushes 95 and 105, brush 95 engages first the post P3 and brush 105 the post P12 as indicated in Fig. 11 at 95a and at 105a respectively. The brush 95 is connected with a wire 115 leading from a current source and brush 105 is connected with the coil of magnet 70 which is connected with a current source wire 116. The first arrangement of brushes will test for all short circuits between any pair of adjacent segments with the exception of between segments connected with posts P12 and P13 and between segments connected with posts P13 and P14. As the commutator holder passes along brush 105 will move into position 105b in which it contacts with posts P12 and P13 while brush 95 is still in contact with post P3 but not in contact with post P2x which is merely an extension of post P2. This arrangement of brushes is shown in Fig. 12 and provides for testing between segments connected with posts P13, and P14. As the commutator holder moves still further the post P13 causes the brush 105 to be cammed downwardly out of contact with post P12 before the brush 95 is cammed out of contact with post P3 due to the camming action produced by post P2x upon the brush 95. The third positions of these brushes 95 and 105 is indicated at 95c and 105c respectively in Figs. 8 and 13. In this position of the brushes the test for short circuits is made between that pair of commutator segments connected with posts P12 and P13. If during any of these tests a short circuit exists such as to cause a circuit to be completed between brushes 95 and 105, the magnet 70 will be energized to attract the latch lever 63 toward its pole piece 70a as viewed in Fig. 6 thereby releasing the spring 58 which operates to push the plunger toward the right and ejects the commutator from the holder while at station A.

It is obvious that the circuit arrangement is necessarily complicated by reason of the fact that there is an odd number of commutator segments making it impossible to locate the contact plungers for engaging these segments all alternately staggered in two rows. If a commutator having an even number of segments is to be tested, it is obvious that all that would be necessary to set up the circuits would be an annular segment having contact plungers engaging with the odd numbered commutator segments and a second conducting segment connected with contact plungers engaging with the even numbered commutator segments. Only one test circuit would be required, that is, one including brushes which respectively engage the two annular segments at the same time.

If the commutator passes inspection at station A, it will be moved to station B where it will be tested for grounds or short circuits between any of its segments and its central core. As the commutator holder passes station B brushes 120 and 121 which are supported by holders 122 and 123 respectively attach respectively to bracket arm 76 and a bracket 124 are caused to engage posts P1 and P13 and then posts P2x and P12 while still engaging posts P1 and P13. The brushes 120 and 121 are connected together with the coil of magnet 71 which is connected with current source wire 116. Current source wire 115 is connected with brush 125 carried by a brush holder 126 attached to a bracket 127. Brush 125 is engaged by the head of a screw 128 connected with the bracket 51 and not electrically connected with the table 27. Thus the bracket adjacent station B is the only part of the apparatus which is connected with a current source at the time the test is made for short circuits between commutator segments and the core. The screw 128 is connected through the bracket 58 with the ejector 56 which bears against the commutator core 44. Therefore, should there be a short circuit between any of the segments and the core, the circuit to the electro-magnet coil will be completed, whereupon the coil will be energized and will attract the latch lever 63 from its latching position, thereby permitting the spring 58 to remove the ejecting plunger 57 outwardly or toward the left as viewed in Fig. 5 thereby ejecting the commutator which will descend through a suitable chute at station B.

As previously explained, a commutator which passes inspection at stations A and B will be automatically ejected from its holder at station C due to the coaction of the cam 74 with the latch lever 63 which is located vertically below the cam when the commutator is at station C. Referring to Fig. 1, numeral 130 indicates the chute for receiving the commutators which are ejected at station A and for conducting them into a suitable receptacle. Likewise, chute 131 receives the commutators ejected at station B and chute 132 those ejected at station C. It is therefore apparent that the testing apparatus separates the good commutators from the defective ones and separates those which are defective by reason of short circuits between adjacent commutator segments from those which are defective by reason of short circuits between any segment and the commutator core. By reason of the present invention, the cost of manufacturing commutators has been substantially reduced by reason of the time and labor saved in inspecting the commutators.

While the form of embodiment of the present invention as herein disclosed, constitutes a preferred form, it is to be understood that other forms might be adopted, all coming within the scope of the claims which follow.

What is claimed is as follows:

1. Commutator testing apparatus comprising, in combination, a holder for receiving a commutator, a plurality of contacts attached to the holder, each contact engageable with a commutator segment, conductors connecting together the contacts in groups, terminals attached to the conductors, a metallic commutator ejector engageable with the commutator core, electrical means for controlling the ejector, a set of contacts respectively engageable with the segment contact terminal posts and connected with the electrical means and a current source whereby the electrical means will be energized in case of short circuit between commutator segments, and a second set of contacts connected with the electrical means and current source, one electrically connectible with the ejector and others electrically connecting together the segment contact terminals whereby the electrical means will be energized in case of short circuit between the core and any of the segments.

2. Commutator testing apparatus comprising, in combination, a plurality of commutator holders, a holder conveyor, circuit connections established at a station into which a holder is conveyed for testing for short circuits between commutator segments and the commutator core, a commutator ejector, electrical means rendered operative in case of short circuit for causing the ejector to remove the commutator at said station, and means for causing the ejector to operate when the holder arrives at a station following.

3. Commutator testing apparatus comprising, in combination, a plurality of commutator holders, a holder conveyor, circuit connections established at a station into which a holder is conveyed for testing for short circuits between commutator segments, circuit connections established at second station for testing for short circuits between the commutator core and the segments, a commutator ejector, and electrical means rendered operative in case of short circuits at either of said stations for causing the ejector to remove the commutator.

4. Commutator testing apparatus comprising, in combination, a plurality of commutator holders, a holder conveyor, circuit connections established at a station into which a holder is conveyed for testing for short circuits between commutator segments, circuit connections established at second station for testing for short circuits between the commutator core and the segments, a commutator ejector, electrical means rendered operative in case of short circuits at either of said stations for causing the ejector to remove the commutator, and means for causing the ejector to operate when the holder arrives at a station following.

5. Commutator testing apparatus comprising, in combination, a plurality of commutator holders, a commutator ejector carried by each holder, circuit connections established at a station into which a holder is conveyed for testing for short circuits between commutator segments and the commutator core, electro-magnetic means rendered operative in case of short circuit for causing the ejector to remove the commutator at said station, and means for causing the ejector to operate when the holder arrives at a station following.

6. Commutator testing apparatus comprising, in combination, a plurality of commutator holders, a commutator ejector carried by each holder, circuit connections established at a station into which a holder is conveyed for testing for short circuits between commutator segments, circuit connections established at a second station for testing for short circuits between the commutator core and the segments, and electro-magnetic means at each station and rendered operative in case of short circuit for causing the ejector to operate.

7. Commutator testing apparatus comprising, in combination, a plurality of commutator holders, a commutator ejector carried by each holder, circuit connections established at a station into which a holder is conveyed for testing for short circuits between commutator segments, circuit connections established at a second station for testing for short circuits between the commutator core and the segments, electro-magnetic means at each station and rendered operative in case of short circuit for causing the ejector to operate, and means for causing the ejector to operate when the holder arrives at a station following.

8. Commutator testing apparatus comprising, in combination, a plurality of commutator holders, contacts carried by each holder each contact engageable with a commutator part, conductors connecting these contacts in groups, terminal posts attached to the conductors, a commutator ejector carried by each work holder, a holder conveyor, brushes located at a station to which holders are conveyed for making contact with the terminal posts one of the brushes being connected with a current source, an electro-magnetic device for controlling the ejector and located at said station and connected with another of said brushes for the purpose of causing the ejector to operate at said station in case of short circuits between commutator parts.

9. Apparatus according to claim 8 further characterized as having means for causing the ejector to operate at a station following to remove any commutator which still remains in a holder.

10. Commutator testing apparatus comprising, in combination, a plurality of commutator holders, contacts carried by each holder each contact engageable with a commutator, conductors connecting these contacts in groups, terminal posts attached to the conductors, a commutator ejector carried by each work holder and engageable with the commutator core, a holder conveyor, brushes located at a station to which holders are conveyed for making contact with the terminal posts one of the brushes being connected with a current source, an electromagnetic device for controlling the ejector and located at said station and connected with another of said brushes for the purpose of causing the ejector to operate at said station in case of short circuits between commutator segments, a second set of brushes located at a second station to which the holders are conveyed one for making connection with the ejector and others for connecting all of the segment contact posts together, said brushes being connected with a current source, and an electro-magnetic device for controlling the ejector and located at said second station and connected in circuit with the current source for the purpose of causing the ejector to operate at the second station in case of short circuits between the core and a segment.

11. Apparatus according to claim 10 further characterized as having means for causing the ejector to operate at a station following to remove any commutator which still remains in a holder.

12. Commutator testing apparatus comprising, in combination, a holder having a recess adapted to receive a cylindrical commutator, contacts carried by the holder and projecting into said recess and arranged to press radially against the commutator segments, means for ejecting the commutator axially from said recess, electrically operated means for controlling the ejector, and devices including said contacts for making circuit connections with metallic parts of the commutator and for connecting the ejector controller with a current source when a short circuit exists between metallic parts of the commutator.

13. Commutator testing apparatus comprising, in combination, a holder having a recess adapted to receive a cylindrical commutator, contacts carried by the holder and projecting into said recess and arranged to press radially against the commutator segments, means for ejecting the commutator axially from said recess, electrically operated means for controlling the ejector, and devices including said contacts for making circuit connections with groups of commutator segments and with the ejector controller and a current source whereby the ejector controller will be energized when a short circuit exists between adjacent commutator segments.

14. Commutator testing apparatus comprising, in combination, a holder having a recess adapted to receive a cylindrical commutator, contacts carried by the holder and projecting into said recess and arranged to press radially against the commutator segments, means for ejecting the commutator axially from said recess, electrically operated means for controlling the ejector, and devices including said contacts for making circuit connections with the commutator segments, commutator core, ejector controller and a current source whereby the ejector controller will be energized when a short circuit exists between any commutator segment and the core.

15. Commutator testing apparatus comprising, in combination, a commutator holder, electrical means for indicating a short circuit, a current source, and devices including contacts bearing against metallic parts of the commutator and switches independent of said contacts for establishing a plurality of circuits between the current source, indicator and contacts whereby a short circuit may be indicated without requiring movement of the commutator relative to the holder.

16. Commutator testing apparatus comprising, in combination, a commutator holder, electrical means for indicating a short circuit, a current source, and devices including contacts bearing against the commutator segments, and switches independent of said contacts for establishing a plurality of circuits between the current source, indicator and contacts whereby a short circuit between adjacent segments may be indicated without requiring movement of the commutator relative to the holder.

17. Commutator testing apparatus comprising, in combination, a commutator holder, electrical means for indicating a short circuit, a current source, and devices including contacts bearing against the commutator segments and commutator core and switches independent of said contacts for establishing a plurality of circuits between the current source, indicator and contacts whereby a short circuit between the core and any segment may be indicated without requiring movement of the commutator relative to the holder.

18. Commutator testing apparatus comprising, in combination, a commutator holder carrying contacts engageable with the segments and core of the commutator, and terminals connected with certain contacts, a current source, an electrical controlled device for indicating a short circuit, means for moving the holder bodily to different positions or stations one of which is a loading station, and contacts at another station for engaging certain holder terminals for completing circuits between a certain group of segments, the current source, the short circuit indicator and another group of segments in order to indicate a short circuit between adjacent segments.

19. Apparatus according to claim 18 further characterized by the provision for the establishing of a plurality of circuits in sequence at the testing station whereby any commutator may be tested for short circuits between its segments without requiring the commutator to be turned in its work holder.

20. Apparatus according to claim 18 further characterized by the provision of a second testing station into which the holder may be moved and at which station contact is made with the holder terminals in such manner that all segments are connected all together and as a group in series with the core of the commutator, the current source and an electrical device for causing a short circuit to be indicated in case of short circuit between the core and any segment.

21. Commutator testing apparatus comprising, in combination, a commutator holder carrying contacts engageable with segments and terminals connected with certain groups of contacts, an ejector movable axially of the commutator core and engaging one end thereof, electrical means for controlling the ejecting movement of the ejector, a current source, means for moving the holder bodily to different positions or stations, one of which is a loading station and contacts at another station for engaging certain holder terminals for completing circuits between a certain group of segment contacts, the current source, the ejector controller and another group of segment contacts in order to cause the ejector to remove a commutator from the holder in case of short circuit between any of its segments.

22. Apparatus according to claim 21 and having means responsive to movement of the holder into still another station for causing the ejector to operate.

23. Apparatus according to claim 21 further characterized by the provision of an arrangement of contacts and terminals at the testing station such that a plurality of testing circuits are completed in succession in order that any commutator may be tested for short circuit between its segments without requiring the commutator to be turned in its holder.

24. Commutator testing apparatus comprising, in combination, a commutator holder carrying contacts engageable with segments and terminals connected with certain groups of contacts, an ejector movable axially of the commutator core and engaging one end thereof, electrical means for controlling the ejecting movement of the ejector, a current source, means for moving the holder bodily to different positions or stations, one of which is a loading station, contacts at another station for engaging certain holder terminals for completing circuits between a certain group of segment contacts, the current source, the ejector controller and another group of segment contacts in order to cause the ejector to remove a commutator from the holder in case of short circuit between any of its segments, and contacts at a third station for engaging certain holder terminals in order to connect all of the commutator segments together and in series with the current source, the commutator core and an electrical device for causing the ejector to remove the commutator in case of short circuit between the core and any of the segments.

25. Apparatus according to claim 24 and having means responsive to movement of the holder into still another station for causing the ejector to operate.

26. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, an electromagnet for retracting the latch whereby the rod is released and is actuated by its spring to remove the commutator, and means including the terminals of the holder for establishing connections between a group of segments, a current source, the electro-magnet and another group of segments whereby the magnet will be energized when a short circuit exists between adjacent segments.

27. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, an electro-magnet for retracting the latch whereby the rod is released and is actuated by its spring to remove the commutator, and means including the terminals of the holder for connecting the commutator segments altogether and in series with a current source, the electro-magnet and the commutator core whereby the magnet will be energized when a short circuit exists between the core and any segment.

28. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between commutator segments, said means including an electro-magnet for retracting the latch and a circuit maker including brushes located at that station and engageable with the terminals of the holder.

29. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between commutator segments, said means including an electro-magnet for retracting the latch and a circuit maker including brushes located at that station and engageable with the terminals of the holder, and mechanical means at another station for retracting the latch.

30. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between the commutator core and any segment and comprising an electro-magnet for retracting the latch and a circuit maker including brushes located at that station and engageable with terminals of the holder and a brush for making a circuit with the core.

31. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between the commutator core and any segment and comprising an electro-magnet for retracting the latch and a circuit maker including brushes located at that station and engageable with terminals of the holder, a brush for making a circuit with the core and mechanical means at another station for retracting the latch.

32. Commutator testing apparatus comprising in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between commutator segments, said means including an electro-magnet for retracting the latch and a circuit maker including brushes located at that station and engageable with the terminals of the holder, means at another station for causing the ejector to operate in case of a short circuit between the commutator core and any segment and comprising an electro-magnet for retracting the latch and a circuit maker including brushes located at that station and engageable with terminals of the holder and a brush for making a circuit with the core.

33. Commutator testing apparatus comprising, in combination, a commutator holder carrying contacts radially engageable with the segments and terminals connected with certain groups of contacts, an ejector rod slidable axially of the commutator, a spring for urging the rod against the commutator, a latch for engaging a stop on the rod to hold the rod in retracted position, a spring urging the latch into rod engaging position, means for moving the holder, rod and latch bodily into different positions or stations including a loading station, means at one station for causing the ejector to operate in case of a short circuit between commutator segments, said means including an electro-magnet for retracting the latch and a circuit maker including brushes located at that station and engageable with the terminals of the holder, means at another station for causing the ejector to operate in case of a short circuit between the commutator core and any segment and comprising an electro-magnet for retracting the latch and a circuit maker including brushes located at that station and engageable with terminals of the holder, a brush for making a circuit with the core and mechanical means at still another station for retracting the latch.

LORA E. POOLE.